Figure 1:
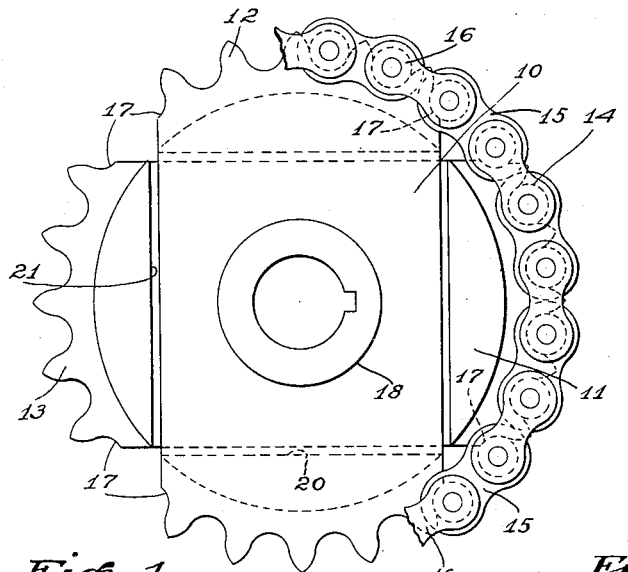

Aug. 8, 1933.     Y. A. AHNGER     1,921,144
FLEXIBLE SHAFT COUPLING
Filed Jan. 28, 1931     2 Sheets-Sheet 1

INVENTOR.
YRJO A. AHNGER.
BY *Wm H. Atkinson*
ATTORNEY.

Aug. 8, 1933.  Y. A. AHNGER  1,921,144
FLEXIBLE SHAFT COUPLING
Filed Jan. 28, 1931    2 Sheets-Sheet 2
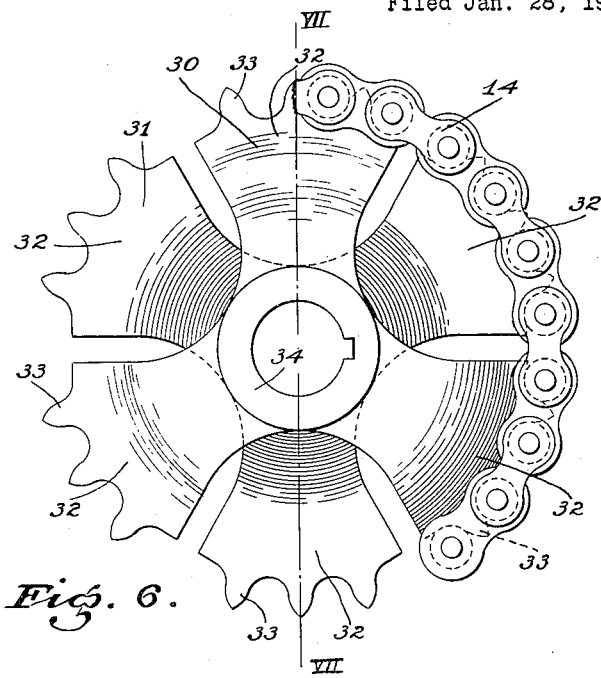
Fig. 6.
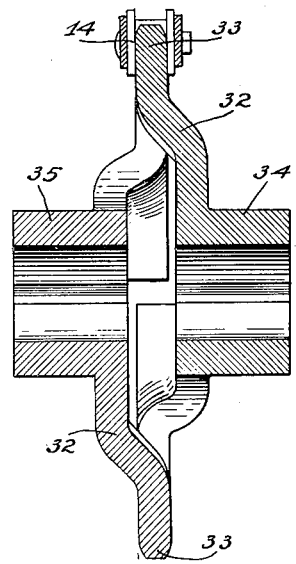
Fig. 7.
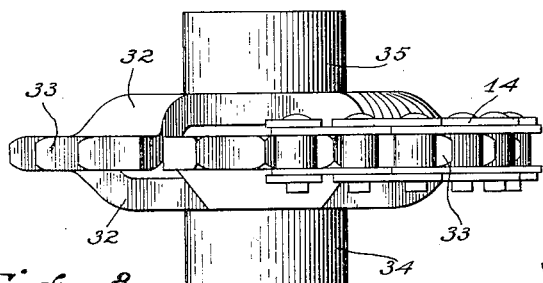
Fig. 8.
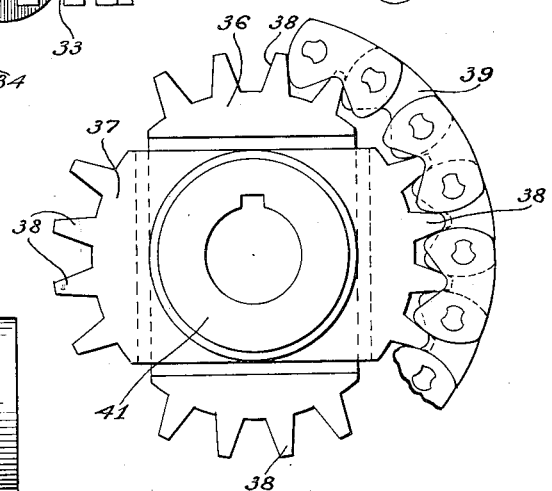
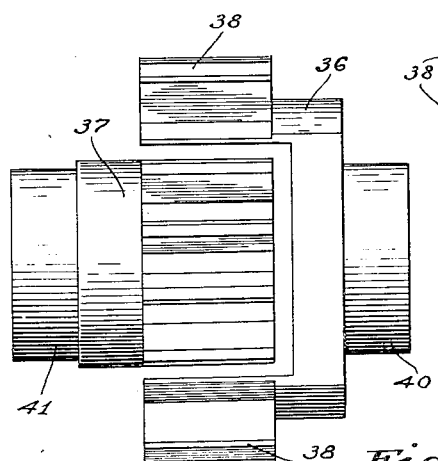
Fig. 10.
INVENTOR.
YRJÖ A. AHNGER.
BY
ATTORNEY.

UNITED STATES PATENT OFFICE 1,921,144

FLEXIBLE SHAFT COUPLING

Yrjo A. Ahnger, Crockett, Calif.

Application January 28, 1931. Serial No. 511,765

13 Claims. (Cl. 64—97)

My present invention relates to shaft couplings and more particularly to a shaft coupling of the type employing flanged coupling members around which a flexible device is placed for connecting the parts together.

An object of my invention is to provide a shaft coupling of the flexible type in which a transmission chain is used and wherein the chain will operate under tension rather than with a shearing stress as do the prior art devices.

Another object of my invention is to provide a special form of coupling flange for chain couplings which will support the chain at all times in a proper and taut position so that it cannot whip and permit backlash between the connected shafts.

A further object of my invention is to provide a shaft coupling of the above type which will permit a disconnection of the two shafts and a removal of either without any axial displacement of the shaft with respect to the coupling.

The prior art couplings of the type contemplated, with which I am familiar, may be said to be represented by the patent to Charles H. Clark, Number 1,147,373 and the patent to Frank L. Morse, Number 1,668,330. In the first above patent the coupling consists of a pair of flat faced members, one of which is mounted on an end of each of the two shafts to be joined, the faced members being provided with teeth to receive a chain for coupling them together.

With reference to the structure of the Clark patent, the following is quoted from the Morse patent: "One of the chief objections incident to this construction has been that the chain pins shear off causing interruption in operation of the device being driven with the possibility of serious damage. In such couplings the pins are subject to direct shear between the face of the flat faced coupling members, in fact the pins alone are subject to all of the shearing stresses."

It is a well known fact that for long life and proper operation of a chain the sprockets over which it passes must be in accurate alignment. This condition is not fulfilled in the Clark structure and consequently it will be evident that the chain portions of this coupling will not operate under conditions that will give a maximum of life.

The sprocket members of a coupling of the Clark type rotate in different planes and as a result they create a considerable stress and strain on the chain which it is not designed to withstand.

A further weakness in the Clark construction is that, where a standard chain is used, the width of the teeth upon the coupling flanges will be less than one half as wide as the teeth for which the chain is designed and consequently the teeth will be weak as compared to the strength of the chain and therefore subject to breakage should a load corresponding to the capacity of the chain be imposed thereupon.

The Morse coupling is unquestionably an improvement upon the Clark structure, but it does not completely solve the problem of shearing stress upon the chain pins as does the applicant's present invention. The Morse structure is only suited to the use of a chain of the so-called silent chain type and even with this type of chain the link pins are subjected to the objectionable feature of shearing.

A further objectionable feature of this latter type of coupling is that it is expensive because of the excessive width of the chain. In this structure substantially two thirds of the chain does no useful work. It is this excessive width of the chain that accounts for the above objectionable feature of shearing on the link pins. This shearing on the pins is further accentuated in the structure disclosed by Morse as the links by virtue of their construction, should there be any looseness in the chain, are subjected to both tension and compression as the coupling rotates.

In the Morse structure the coupling faces are each provided with a plurality of radially arranged interlocking portions which necessitate an axial movement of one or the other of the couplings when it is desired to disconnect or remove one of the shafts.

This latter objectionable feature is entirely overcome in the couplings proposed by the present invention as the offset or interlocking portions are so disposed that the coupling members may be moved radially with respect to each other without any axial displacement thereof in disconnecting or replacing a shaft.

In carrying out my invention I propose to so construct the coupling members that a standard chain may be used with a maximum of efficiency. To accomplish this the chain supporting sectors are so disposed that the chain will be held at all times in a single plane with the operating links under tension and in substantially concentric relation with the coupling. I also provide teeth upon the coupling members which are of the proper width and cut in conformity with the type of chain used.

Another important feature of my present invention is in the disposition of the chain sprocket sectors so that the coupling members can be separated without any axial displacement of the coupled shafts.

For a better understanding of my invention reference should be had to the accompanying drawings wherein I have shown by way of illustration and not of limitation certain preferred embodiments thereof.

In these drawings wherein like numerals refer to like parts throughout the several views—

Figure 2:
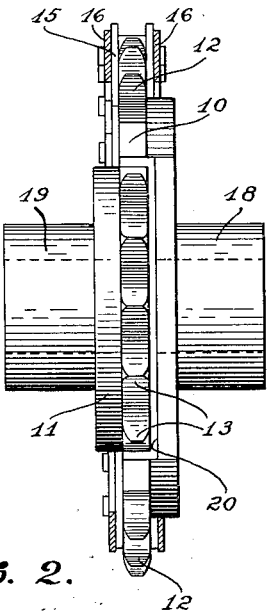
Figure 4:
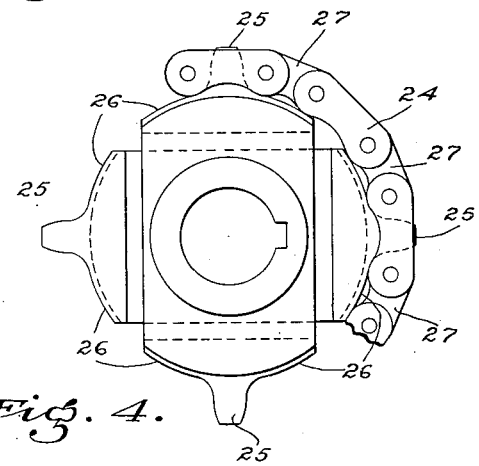
Figure 3:
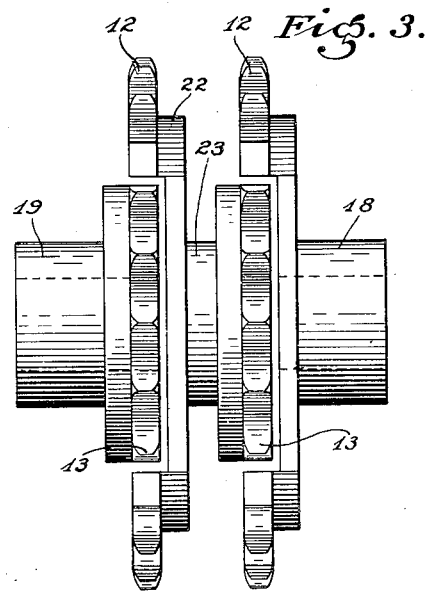
Figure 5:
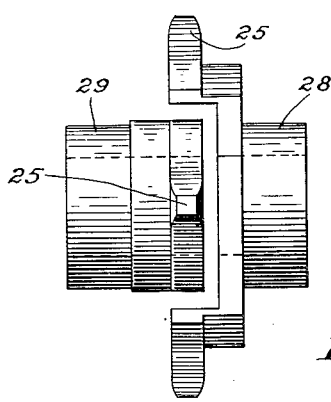

Figure 1 is an end elevation of one embodiment of my invention with a portion of a chain thereupon, Figure 2 is a side elevation of the device illustrated in Figure 1, Figure 3 is a view similar to Figure 2 showing the structure of Figures 1 and 2 embodied in a double action flexible coupling arrangement, Figure 4 is an end view of a modified form of my improved coupling, Figure 5 is a side elevation of the coupling shown in Figure 4, Figure 6 is an end view showing a further modification of my invention, Figure 7 is a sectional view taken along line VII—VII of Figure 6, Figure 8 is a view looking down upon the coupling shown in Figure 6, Figure 9 is an end view illustrating the application of a silent chain to my invention, and Figure 10 is a side elevation of the coupling shown in Figure 9 with the silent chain removed.

By referring now to the drawings it will be seen that the embodiment of my invention illustrated in Figures 1 and 2 comprises a pair of oppositely disposed members which I shall designate by the numerals 10 and 11. These members 10 and 11 are shown as identical in shape. The member 10 is provided with two sprocket sectors having teeth 12 and the member 11 has similar sectors which carry teeth 13. The teeth 12 and 13 upon the sprocket sectors of the members 10 and 11 are arranged in proper spaced relation about the peripheries of the different sectors and the sectors themselves are of a sufficient circumferential length to support all the links of a chain. In these figures of the drawings I show a chain 14 of the roller type surrounding the sprocket sectors.

The chain 14 is shown as having inner links 15 and outer links 16 at each end of its rollers. A close inspection of the drawings will reveal that in each embodiment of my invention I have provided a sufficient arcuate length of sprocket sector to support each link of the chain used. In Figure 1 all of the links 15 and 16 are shown as supported upon the teeth 12 and 13 by means of the rollers therebetween. The sprocket sectors are also shown as of such a length that only one tooth is omitted between the adjacent sectors. At the ends of the sectors I continue the roots of the teeth as at 17 so as to provide a perfect fit for the chain at this point. This is an important feature of my device as it prevents whipping of the chain and consequently a backlash between the shafts.

By referring to Figure 2 it will be seen that members 10 and 11 are provided respectively with hubs 18 and 19 by means of which the members may be attached to the ends of two coaxial shafts. The members 10 and 11 are also shown as having transversely extending recesses 20 and 21 between the sprocket sectors. These transversely extending recesses are thus disposed between the sectors so that when the chain 14 is removed the members 10 and 11 may be displaced radially with respect to each other without any axial displacement of the shafts or coupling members. At this point it should be stated that one such transverse groove or recess will be sufficient to accomplish the object sought and therefore I may in some cases provide a recess on only one of the coupling members.

In Figure 3 of the drawings I show my invention embodied in a double action flexible coupling arrangement. As here shown I dispose a third member 22 between the members 10 and 11. In this device the members 10 and 11 are identical with those described above and the member 22 comprises a central hub 23 upon the ends of which there is provided sprocket sectors having teeth corresponding to those upon the members 10 and 11.

In Figures 4 and 5 there is shown a modification of my invention in which a block chain 24 is applied to the coupling. When such a chain is used, if the coupling is of small dimensions, I may provide only a single tooth 25 at the center of each of the sprocket sectors. Where a single tooth 25 is provided in the center of the sectors as shown, the sectors are continued at the root of the tooth as at 26 so as to form a support for the blocks 27 of the chain 24. In these figures of the drawings the coupling members are also provided with suitable hubs 28 and 29 for attachment to the coupled shafts.

In the embodiment of my invention illustrated in Figures 6, 7 and 8, I show two oppositely disposed similar coupling members 30 and 31, each of which carry three spaced and offset sprocket sectors 32. Each of the sprocket sectors 32 are shown as provided with three teeth 33 and the roots of the end teeth are continued out, as has been explained, so as to form a support for the chain 14 at the points where the sectors end. The coupling members 30 and 31 are provided respectively with hubs 34 and 35 for mounting upon the ends of two shafts.

In Figures 9 and 10 of the drawings there is illustrated a coupling suitable for use with a chain of the silent chain type. The coupling members here designated by the numerals 36 and 37 are each provided with specially designed gear teeth 38 for a silent chain 39 and have respectively hubs 40 and 41 which engage the shafts. As illustrated the members 36 and 37 are provided with recesses which extend under the gear sectors as previously described so that when the silent chain is removed the coupling can be easily separated. The problem of maintaining the chain 39 upon the teeth 38 can be solved in this coupling by cutting a groove around the teeth, as is standard practice, or by providing wide side links upon the chain which extend over the ends of the teeth as shown.

From the above it will be seen that I have provided a chain coupling in which the chain portion of the coupling will always operate under proper conditions and in which sprocket teeth of proper width for the chain may be used. These features insure that the chain will operate under tension and therefore avoid the undesirable and destructive transverse stresses and strains to which the chains of the prior art devices are subject.

A further advantage over the couplings of the prior art which this invention possesses is that it can be quickly disconnected and a shaft removed without any interference between the coupling members.

Another important feature of my invention is that my complete coupling requires less than half the number of teeth provided upon the coupling members of the Clark and Morse devices. This will be recognized as an important improvement when it is appreciated that the cutting of these teeth is costly and requires a special machine operation and the services of a skilled workman.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. A quick detachable coupling for power transmission shafts, comprising a pair of oppositely disposed members adapted to be secured upon adjacent ends of shafts to be coupled, each of said members having sprocket sectors formed thereupon, one of said members having a transversely extending recess between its sprocket sectors having a minimum width greater than the chord dimension of said sectors into which the sector supporting portion of the other member may be disposed, whereby the sprocket sectors on said members may be disposed in the same plane and be moved radially into and out of interlocking engagement without axial displacement of said shafts, and a chain encircling said sprocket sectors and held on its pitch circle for transmitting power between the coupled shafts.

2. In a detachable coupling for power transmission shafts, the combination of a member adapted to be secured upon the end of a shaft, a pair of oppositely disposed sprocket sectors upon said member, a second member adapted to be secured upon the end of another shaft having similarly disposed sprocket sectors thereupon and a transversely extending recess in the face thereof into which the sector carrying portion of said first member may be disposed, said recess having a minimum width greater than the chord dimension of said sectors whereby the sprocket sectors on each of said members may be disposed in the same plane and be moved radially into and out of interlocking engagement without axial displacement of said shafts, and a sprocket chain adapted to engage said sprocket sectors, the peripheral length of said sprocket sectors being sufficient to support the chain throughout its length and hold it in a substantially circular path as said shafts rotate.

3. A quick detachable coupling for power transmission shafts, comprising a pair of oppositely disposed members mounted at a right angle to each other upon the adjacent ends of a pair of coaxial shafts, sprocket sectors upon each of said members adapted to be moved radially into and out of interlocking engagement without axial displacement of said shafts, said sprocket sectors having a total circumferential length sufficient to hold a connecting chain in a circular path, and a single chain encircling said sprocket sectors adapted to be placed under tension when said shafts rotate.

4. A quick detachable coupling for power transmission shafts comprising a pair of oppositely disposed members adapted to be secured upon adjacent ends of shafts to be coupled, oppositely disposed interlocking sectors formed upon each of said members having a total peripheral length sufficient to form a continuous circular bearing for a connecting chain, the sprocket sectors upon at least one of said members being cut off along lines parallel to a line tangent to the pitch circle to form a transversely extending recess therebetween so that said members may be moved radially into and out of interlocking engagement without axial displacement of the shafts, and a chain encircling said sprocket sectors for transmitting power between the coupled shafts.

5. A quick detachable coupling for axially aligned shafts, comprising a flanged coupling member having a relatively wide diametrically extending parallel sided recess in the face thereof, a second coupling member adapted to be disposed in said recess, and oppositely disposed sprocket sectors upon each of said coupling members adapted to be disposed in the same plane and support a coupling chain, the sprocket sectors upon each of said coupling members being disposed with respect to the recess in said first coupling member so that the second coupling member may be moved radially through said recess in a straight line extending at a right angle to said shafts when the coupling chain is removed.

6. A quick detachable coupling for axially aligned shafts, comprising a flanged coupling member having a relatively wide diametrically extending recess in the face thereof, a second and similar flanged coupling member having a like recess in the face thereof, and oppositely disposed sprocket sectors upon each of said coupling members adapted to be disposed in the same plane and support a coupling chain, the sprocket sectors upon each of said coupling members having a total circumferential length sufficient to support the coupling chain on its pitch circle and being so shaped and disposed with respect to the recesses in said coupling members that the coupling members may be moved out of engagement through one of said recesses when the coupling chain is removed.

7. A pair of oppositely disposed coupling members having transversely extending flanges which lie at right angles to each other, said flanges having overhanging sprocket sectors at their ends which will interlock in a plane at a right angle to the axis of the coupling members and support a connecting chain, the circumferential length of said sectors being such that they will support the connecting chain on its true pitch circle and having their inner dimensions defined by a chord extending substantially from their ends to permit a radial displacement of the coupling members without axial movement thereof when the chain is removed.

8. A pair of oppositely disposed coupling members having transversely extending flanges which lie at right angles to each other, said flanges having overhanging sprocket sectors at their ends which will interlock in a plane at a right angle to the axis of the coupling members and support a connecting chain, said sectors having a total circumferential length that will support the connecting chain on its true pitch circle and having inner surfaces extending in a straight line between their ends, whereby the sectors of the co-operating coupling members may move radially out of interlocking relation when the chain is removed therefrom.

9. In a flexible coupling for axially aligned shafts, the combination of a pair of coupling members disposed oppositely at right angles to each other and having a recess extending diametrically there across parallel with the opposite member, overhanging sectors at the ends of said members disposed at the sides of said recesses and in circumferential alignment, said recesses being of such depth and width that the coupling members may be moved into and out of axial alignment without axial displacement thereof, the total number of teeth upon all of said sectors being four less than the total number of teeth upon a complete sprocket of the same pitch diameter, and an encircling chain disposed about said sprocket sectors.

10. In a quick detachable flexible coupling for axially aligned shafts, the combination of a pair of coupling members disposed opposite and at right angles to each other and having a recess extending diametrically there across parallel with the opposite member, overhanging sprocket sectors upon the ends of each of said members adapted to be located in interlocking relation having their inner surfaces tangent to and removed from their center of rotation a distance sufficient to permit a radial movement of the cooperating sectors therebetween, whereby said members may be moved into and out of axial alignment without axial displacement thereof, the total number of teeth upon all of said sectors being four less than the total number of teeth upon a complete sprocket of the same pitch diameter, and an encircling chain disposed about said sprocket sectors.

11. In a flexible coupling of the character described, the combination of a pair of coupling members disposed in opposed relation to each other, said members having arcuate sprocket sectors formed at their ends projecting in interlocking relation with each other, the total number of teeth upon said sectors being less in number than the number of teeth upon a complete sprocket of similar size, a tooth being omitted at the end of each sector at the meeting point between the sectors, each of said members also having a transverse groove extending between its sprocket sectors the sides of which are defined by a chord extending between the ends of the sectors, and a sprocket chain encircling said sectors.

12. A coupling consisting of a pair of oppositely disposed coupling members having outwardly extending flanges, said flanges having overhanging sprocket sectors at their ends which will interlock in a plane at a right angle to the axis of the coupling members, each of said sprocket sectors having the roots of its end teeth extended out so that the combined circumferential length of said sprocket sectors including the tooth root extensions is such that the sectors will support an encircling chain on its true pitch circle, the maximum chordal width of the sprocket sectors including the tooth root extensions being less than the minimum distance between two sectors of the oppositely disposed coupling member, so that said members may be moved radially into and out of interlocking engagement without axial displacement of either coupling member, and an encircling chain engaging the teeth upon the sectors.

13. A quick detachable coupling consisting of a pair of oppositely disposed coupling members having outwardly extending flanges, said flanges having overhanging sprocket sectors at their ends which will interlock in a plane at a right angle to the axis of the coupling members, said sprocket sectors having a total circumferential length sufficient to support an encircling chain on its true pitch circle, the maximum chordal width of the sprocket sectors being less than the minimum distance between the two adjacent sectors of the oppositely disposed coupling member, so that said members may be moved radially into and out of interlocking engagement without axial displacement of either coupling member, and an encircling chain engaging the teeth upon the sectors.

YRJO A. AHNGER.